United States Patent
Amini et al.

(10) Patent No.: US 7,539,753 B2
(45) Date of Patent: May 26, 2009

(54) METHODS AND APPARATUS FOR FUNCTIONAL MODEL-BASED DATA PROVENANCE IN STREAM PROCESSING ENVIRONMENTS

(75) Inventors: Lisa Amini, Yorktown Heights, NY (US); Marion Lee Blount, Mahopac, NY (US); John Sidney Davis, II, New York, NY (US); Wim De Pauw, Scarborough, NY (US); Archan Misra, Bridgewater, NJ (US); Daby Mousse Sow, White Plains, NY (US); Chitra Venkatramani, Roslyn Heights, NY (US); Min Wang, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 11/760,070

(22) Filed: Jun. 8, 2007

(65) Prior Publication Data
US 2008/0307104 A1 Dec. 11, 2008

(51) Int. Cl.
*G06F 11/34* (2006.01)
(52) U.S. Cl. .................. 709/224; 709/223; 709/231
(58) Field of Classification Search ................ 709/224, 709/223, 231, 236
See application file for complete search history.

(56) References Cited
U.S. PATENT DOCUMENTS

2007/0106693 A1* 5/2007 Houh et al. ............. 707/104.1
2007/0118873 A1* 5/2007 Houh et al. .................. 725/136

OTHER PUBLICATIONS

D. Husemann et al., "Personal Mobile Hub," 8th International Symposium on Wearable Computers (ISWC), Nov. 2004, pp. 85-91.
E. Lubrin et al., "MoteCare: An Adaptive Smart Ban Health Monitoring System," Proceedings of the 24th IASTED International Multi-Conference Biomedical Engineering, Feb. 2006, pp. 60-67, Austria.

(Continued)

*Primary Examiner*—Kenneth R Coulter
(74) *Attorney, Agent, or Firm*—Kenneth R. Corsello; Ryan, Mason & Lewis, LLP

(57) ABSTRACT

Techniques for deriving a provenance of one or more of a plurality of output data elements generated from a given output port of a PC are provided. At least one dependency function is created that relates the one or more output data elements to a set of one or more input ports of the PC and a corresponding plurality of input data elements. The dependency function comprises an encoding of at least one of one or more temporal filters and one or more sequence filters relating to the plurality of input data elements. The at least one dependency function is stored. A history of stream-level bindings of one or more input streams to one or more input ports of the processing component and one or more output streams from one or more output ports of the processing component is stored. The plurality of input data elements belonging to the one or more input streams and the plurality of output data elements belonging to the one or more output streams are stored. The set of one or more input data elements from the plurality of input data elements are determined that relate to the one or more output data elements in accordance with at least one dependency function and the history of stream-level bindings.

19 Claims, 10 Drawing Sheets

OTHER PUBLICATIONS

Y.L. Simmhan et al., "Performance Evaluation of the Karma Provenance Framework for Scientific Workflows," International Provenance and Annotation Workshop (IPAW), May 2006, pp. 1-15.

P. Groth et al., "A Protocol for Recording Provenance in Service-Oriented Grids," Proceedings of the 8th International Conference on Principles of Distributed Systems (OPODIS), Dec. 2004, 12 pages.

K.-K. Muniswamy-Reddy et al., "Provenance-Aware Storage Systems," Proceedings of the USENIX Annual Technical Conference, Jun. 2006, 14 pages.

L. Chen et al., "A Proof of Concept: Provenance in a Service Oriented Architecture," Proceedings of the Fourth All Hands Meeting (AHM), Sep. 2005, 8 pages.

C. Sar et al., "Lineage File System," http://crypto.stanford.edu/~cao/lineage-fs.ps, pp. 1-6, Jan. 2005.

M. Blount et al., "Century: Automated Aspects of Patient Care," 13th IEEE International Conference on Embedded and Real-Time Computing Systems and Applications (RTCSA), Aug. 2007, 6 pages.

N.N. Vijayakumar et al., "Towards Low Overhead Provenance Tracking in Near Real-Time Stream Filtering," International Provenance and Annotation Workshop (IPAW), May 2006, pp. 46-54.

M. Nicola et al., "XML Parsing: A Threat to Database Performance," 12th International Conference on Information and Knowledge Management (CIKM), Nov. 2003, 4 pages, Louisiana.

M. Blount et al., "A Time-and-Value Centric Provenance Model and Architecture for Medical Event Streams," HealthNet '07, Jun. 11, 2007, 6 pages, Puerto Rico.

Y.L. Simmhan et al., "A Survey of Data Provenance in e-Science," SIGMOD Record, Sep. 2005, pp. 31-36, vol. 34, No. 3.

R. Bose, "A Conceptual Framework for Composing and Managing Scientific Data Lineage", 14th International Conference on Scientific and Statistical Database Management (SSDBM), 2002, pp. 15-19, Scotland.

Y. Cui et al., "Practical Lineage Tracing in Data Warehouses," in Proceedings of the 16th International Conference on Data Engineering (ICDE'00), Feb. 2000, pp. 1-21, California.

\* cited by examiner

US 7,539,753 B2

METHODS AND APPARATUS FOR FUNCTIONAL MODEL-BASED DATA PROVENANCE IN STREAM PROCESSING ENVIRONMENTS

FIELD OF THE INVENTION

The present invention relates to data management and query support in data analysis and, more particularly, to techniques for expressing provenance models and answering provenance queries that relate to output data elements that result from the analysis and transformation of input data streams.

BACKGROUND OF THE INVENTION

Data provenance involves the management of metadata about the history, generation and transformation of data. Data provenance is of special importance in large data processing systems in which data is operated on and routed between networked processing components (PCs). In many situations it is important to verify the origins and causal factors of data produced by such a cascaded application of distributed PCs.

A given data element that has a value of interest might lead to a query about the provenance of that datum, perhaps to determine why the data element has a particular value, or why the element was generated in the first place. Such provenance queries can be difficult to compute for several reasons. First, it is often the case that a graph of networked processing components is dynamic. Links between the PCs may be added and removed over time and the PCs may be replaced according to changing processing needs. Such mutability implies that the processing path, including the PCs and the associated streams or data elements, involved in the generation of a given data element is subject to variation in time and hence, requires a system for keeping track of the system changes.

A second difficulty with provenance queries is that processing networks often consist of a large set of PCs with a large set of stakeholders involved in the design, implementation and selection of the PCs. Given the many players involved in the creation and execution of a data processing network, maintaining a consistent design and implementation approach to the PCs becomes challenging and results in responses to provenance queries that may not be consistent across the network of components.

Finally, many of the processing systems operate on large volumes of data, generated by variable numbers of data streams. Given the high volume and data rates, it is essential that the provenance technologies impose low additional overhead on both the data storage and the processing complexity. For these three reasons, special attention is required to design a storage-efficient provenance management system that responds to provenance queries in a timely manner, and is yet expressive enough to capture many common cases of dependencies typical in stream processing systems.

In a stream processing system, applications are deployed as a network of PCs, which perform various operations on input data elements in order to generate output data elements. These output data elements are referred to as the results of the stream processing system. Examples of input data elements include packets of audio data, email data, computer generated events, network data packets, or readings from sensors, such as environmental, medical or process sensors. Examples of transformations conducted by individual PCs deployed on a stream processing graph include parsing the header of a network, aggregating audio samples into an audio segment or performing speech detection on an audio segment, subsampling sensor readings, averaging the readings over a time window of samples, applying spatial temporal or frequency filters to extract specific signatures over the audio or video segments, etc. These PCs produce results as a stream of output data elements or may produce individual output data elements consumed by some external monitoring applications.

A stream-processing "application" in such stream-oriented systems consists of a network of PCs, where the stream of output data elements from one PC serves as the stream of input data elements to another PC. An application may thus be modeled as a directed graph, with each vertex of the graph representing a PC and the edges between graphs establishing the bindings between sources and sinks of streams of data. An example provenance query might then be to determine the sequence of processing PCs that generated a given result, such as, for example, set of output data elements. Alternatively, another provenance query might be to additionally determine the specific set of (often a hierarchy of upstream data elements) data elements, generated by an appropriate set of PCs lying upstream in the application processing graph, that generated a given result, such as, for example, a set of output data elements.

The majority of the previous work on data provenance has fallen into two broad categories. Scientific and web-service workflows, including systems such as Karma, see, Y. L. Simmhan, B. Plale and D. Gannon, *Performance Evaluation of the Karma Provenance Framework for Scientific Workflows*, International Provenance and Annotation Workshop (IPAW), May 2006, and PreServ, see, P. Groth, M. Luck, L. Moreau, *A protocol for recording provenance in service-oriented grids*, Proc. of the 8th International Conference on Principles of Distributed Systems (OPODIS'04), December 2004, are designed to capture interactions among various components for data-driven scientific workflows, such as atmospheric sensing and genomic computing. Similarly, systems such as PASOA are designed for web services environments and focus purely on process provenance; specifically, they store the history of inter-component interactions, such as, for example, SOAP invocations, rather than the actual transformation of the datasets or the actual datasets consumed by a specific web service. A survey of various techniques for provenance in scientific environments is provided in Survey of Data Provenance in e-Science (SigMod). In general, all of the mechanisms for capturing provenance use logging and auditing mechanisms to track dependencies of entire streams rather than windows of data.

Some of the data provenance systems presented in SigMod use the annotation approach, whereby the system tracks all the provenance information for each data item separately and stores this as part of the metadata associated with each individual data item. Such an annotation approach is reasonable for scientific data sets, as many of the data items, such as, for example, astronomy observations or genetic sequences, are very large in size and the additional provenance-related information constitutes a very small overhead. In contrast, each individual element in a stream-based system is very small, and the volume of such elements is very large—this makes annotation-based systems impractical due to their prohibitive storage and per-element processing overhead.

Another approach to process provenance is described in the work of R. Bose, "A conceptual framework for composing and managing scientific data lineage", 14th International Conference on Scientific and Statistical Database Management (SSDBM'02) pp. 15-19, which tries to find the creators of source data to verify copyrights. This is achieved by a conceptual framework that helps identify and assess basic lineage among system components. In summary, the existing techniques determine the provenance at the level of the streams, a coarse granularity.

Provenance techniques in File Systems and Databases, including approaches such as PASS, see, K. Muniswamy-Reddy, D. Holland, U. Braun and M. Seltzer, *Provenance-Aware Storage Systems*, Proc. of the 2006 USENIX Annual Technical Conference, June 2006, and LinFS, are typically annotation-based in that they associate provenance metadata with individual data items, such as files or DB records. As an example, PASS automatically stores the modification history of files, including information on the calling application, the file descriptor table, etc.

Another example of provenance in databases lies in the work in Y. Cui et al., "Practical Lineage Tracing in Data Warehouses," in *ICDE*, 2000, on tracing the data lineage obtained by view-based transformations in relational databases. This work describes how the source data can effectively be reconstructed by 'inverting the query' that defines a derived view, when the operations fall in the ASPJ (Aggregate-Select-Project-Join) operator category.

There is some limited work on the topic of supporting provenance tracking in stream-based systems. One approach towards such provenance tracking was described in N. Vijayakumar et al., "Towards Low Overhead Provenance Tracking in Near Real-time Stream Filtering," International Provenance and Annotation Workshop, 2006, which dynamically constructs a dependency tree from base streams to derived streams, where each derived stream is expressed as an adaptive filter over multiple base or derived streams. For each stream, dynamic provenance information is collected as a series of time-stamped events. That is, as and when a filter detects an "event", it pushes a time-stamped record about the change to its stack. Later, when the provenance has to be retrieved, the provenance tree can be traversed followed by the stack to determine the events that led to a derived event. This approach tries to associate provenance information at the stream-level, rather than trying to establish specific dependencies between individual elements of derived streams and corresponding subsets of data from base streams. In particular, Vijayakumar does not provide the notion of having a dependency function be explicitly specified for each output port of a PC, and does not describe how specific external state that affects the functional dependency can be tracked and used in the provenance derivation process.

The notion of a 'dependency function' has been defined in some other contexts related to provenance, notably for optimistic recovery from faults in a distributed multi-processor system. For example, U.S. Pat. No. 4,665,520, defines a method where each process (Pi) in a distributed system store a set of messages (since the last commit) that other processors (Pj) might depend on. Only after Pj has committed and migrated to state Pj (t+1), will Pi remove the set of messages (defined in the set interval(Pi(t)). In case Pj fails, the system allows Pj to recreate its state by "replaying" the set of dependent messages (in the dependency vector) list the last commit. While this patent does define the notion of a "dependency function," such a dependency function is used only to enable message replay between specific components.

Such stream processing systems are characterized by high data rates in which streams of data events consist of a set of events that are logically related and are sequentially ordered. Unfortunately, simple application of an annotation-based approach or a process-based approach is not sufficient for streaming data systems. Due to the high data rates associated with streaming systems, the annotation approach is not sufficient because the large volume of data will require equally large volumes of provenance metadata. Due to the time-varying nature of the streaming systems, a static process-oriented approach will be unsatisfactory because a given processing component's linkages to other PCs may vary over time as changes in the network topology occur. Moreover, a process oriented approach is insufficient to answer questions about the dependencies among the data elements themselves, which may be needed in many scenarios involving the automated processing of sensor data streams. Therefore, a novel hybrid provenance management system is needed that efficiently addresses the challenges of stream-oriented data processing systems.

SUMMARY OF THE INVENTION

The present invention provides a system and method for intelligently capturing the metadata about the operations conducted by a stream processing system on input data elements in order to generate results, in the form of output data elements, and a method for using that metadata to determine the provenance of said results.

In accordance with one aspect of the present invention, a method for deriving a provenance of one or more of a plurality of output data elements generated from a given output port of a PC is provided. At least one dependency function is created that relates the one or more output data elements to a set of one or more input ports of the PC and a corresponding plurality of input data elements. The dependency function comprises an encoding of at least one of one or more temporal filters and one or more sequence filters relating to the plurality of input data elements. The at least one dependency function is stored. A history of stream-level bindings of one or more input streams to one or more input ports of the processing component and one or more output streams from one or more output ports of the processing component is stored. The plurality of input data elements belonging to the one or more input streams and the plurality of output data elements belonging to the one or more output streams are stored. The set of one or more input data elements from the plurality of input data elements are determined that relate to the one or more output data elements in accordance with at least one dependency function and the history of stream-level bindings.

In additional embodiments of the present invention a history of a state of the PC may be stored. The state comprises at least one of an internal state and an external state. The set of one or more input data elements may be determined in accordance with the history of the state. The step of determining the set of one or more input data elements may comprise the steps of determining at least one of the one or more input streams that contributed to the generation of the given output data element from the history of stream-level bindings, and applying at least one dependency function, chosen based on the history of the state, over at least one of the one or more input streams to determine the set of one or more input data elements that satisfy the at least one dependency function.

An advantage of the present invention is the ability to store and use the history of stream-level bindings when the bindings are dynamically created, modified or destroyed during the lifetime of the execution of the specified instance of the PCs.

It is also an advantage of the present invention that the steps of storing and using the history of stream-level bindings, the internal state of a PC, the external contextual state of the environment can be accomplished by storing the said metadata on a persistent storage medium, or by appending to one or more output data elements, such that this information is directly available as part of the set of attributes associated with said output data elements.

A further advantage of the present invention is the ability to resolve the set of data elements, from a set of dynamically created, modified or destroyed data streams, which are functionally specified to be responsible for the generation of another specific output data element, without requiring this set to be explicitly enumerated and stored for each such output data element.

Another advantage of the present invention is that the history of stream-level bindings can be specified and stored at varying granularity, with the attendant contextual state of the environment also being stored at the corresponding granularity. Allowing the storage of these bindings at varying granularities provides the metadata capture sub-system the ability to store a small fraction of the total generated stream data and permits the provenance derivation mechanism to derive the set of causative data elements occurring at varying upstream points in the processing graph.

Other aspects and advantages of the present invention will become apparent from the following detailed description, taken in conjunction with the accompanying drawings, illustrating by way of example, the principles of the invention.

DETAILED DESCRIPTION

Figure 1:
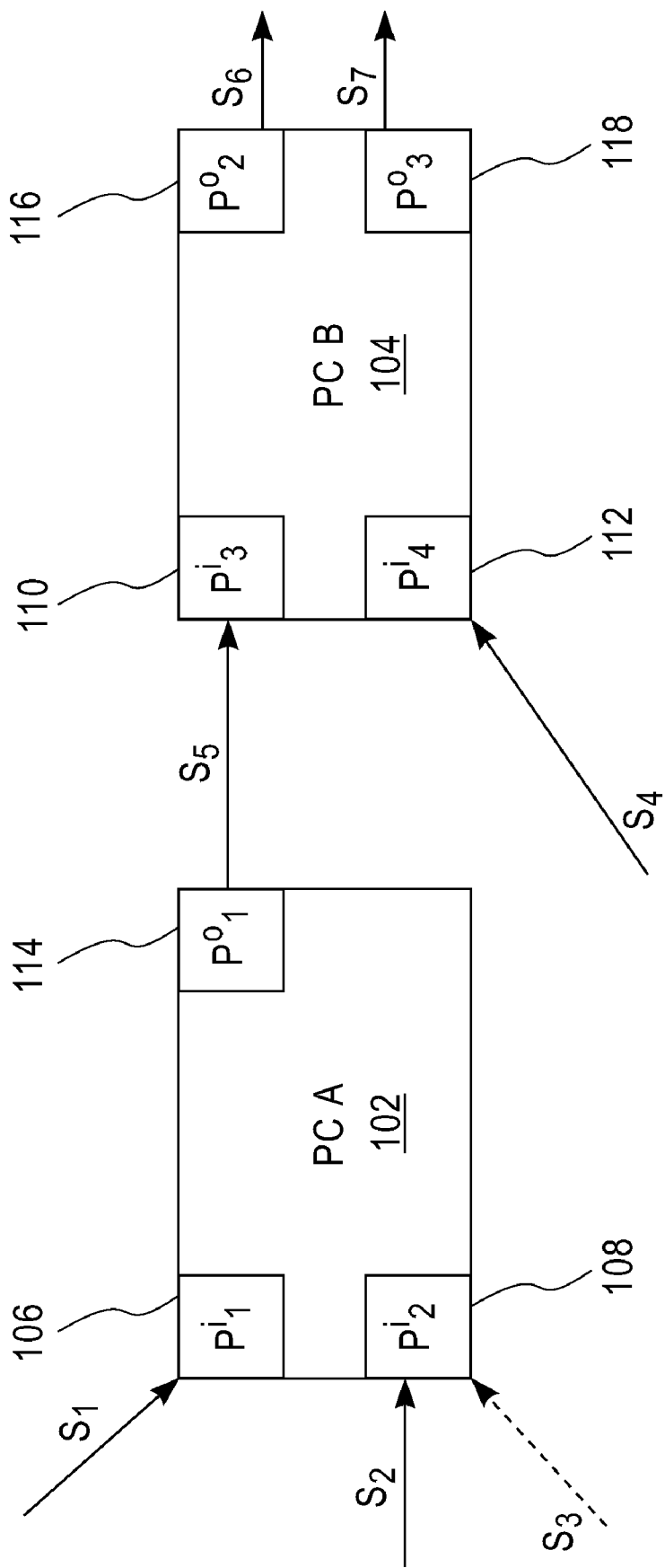
FIG. 1 is a diagram illustrating the various components of a generic stream processing system, according to an embodiment of the present invention.

This invention is directed towards a mechanism for capturing both the data and process level dependencies of output data elements of an event stream generated by the application of one or more stream PCs to a set of input streams.

The embodiments of the present invention achieve compact representation. The mechanism for capturing the dependencies does not require the storage of significant amounts of metadata, over and above the unavoidable need to store the underlying data elements of the input and output streams.

The embodiments of the present invention further achieve reasonable expressiveness, allowing dependencies to be defined both in terms of intervals of time and sequences, and additionally qualified with predicates filtering the inclusion of elements in the dependency set. The mechanism should allow the capture and use of a variety of dependency primitives, specifically including situations where the dependency behavior may vary based on some internal state of the PCs or some external state that modifies the logic of a PC.

For compact representation, this invention however considers only dependencies that are consistent across time, such as, for example, given an identical value of internal state or external context at different time instants, the dependency function should be specifiable for all such instants in terms of generic attributes such as relative time windows, number of past input samples, or specific predicates applied to attribute values possessed by such samples. The invention does, however, allow the dependency function to have some functionally-expressible dependency on time (e.g., indicating that the dependency interval is doubled from the normal value for elements generated on Mondays and Fridays). To that extent, the dependency function need not be completely time-invariant, but should be invariant to the exact values of the individual data elements.

The embodiments of the present invention have a set of explicitly defined dependency functions available for each output stream generated by a stream PC, such that an individual dependency function relates the output set of elements generated at a particular time instant to a computable set of elements from the corresponding input set of streams. In particular, the invention requires the stream processing system to have some way to be able to identify the set of dependency functions for each instance of the PC. This can be done by either storing the dependency function and its mappings individually for each instance of a PC, or by storing a generic dependency function for a logical instance of the PC and storing additional per-instance information, such that the exact stream dependencies for each instance of the PCs can be resolved through use of the generic dependency function.

The invention does not concern itself with the way the explicitly defined function is created. It is an implicit aspect of this invention that the dependency function could have been specified explicitly by humans, such as, for example, by the developer of the PC's logic, generated automatically through a combination of human input and automatic processing, such as, for example, by having the developer of the processing component declare the PC's logic as belonging to certain dependency classes, and then having the provenance system utilize the properties of the dependency classes to create the full specification of the dependency specification, or inferred by the provenance system, such as, for example, by inferences based on the properties of the actual evolution of output data element values generated by the PC in response to elements of input streams.

The embodiments of the present invention store the history of the bindings of input streams to specific input ports of the processing elements, and the bindings of the output streams generated by specific output ports of the processing elements. In particular, an aspect of this invention is its ability to provide such dependency support for processing systems where the bindings are either a) static, defined and identified at the time the specific instance of the PC or application is instantiated or the logical instance is defined, or b) dynamic, where the streams may be bound to specific ports for different, initially unknown, sets of time intervals, with the specific time periods depending on both the dynamic properties of the streams or the state of the stream processing system. In particular, dynamic bindings also arise when some streams prove to be ephemeral, being defined and emitting data for only relatively small intervals of time before the stream is destroyed.

In addition to the stream bindings, the invention requires the system to store the appropriate history of the relevant internal state of the PC or the external contextual data. Embodiments of this invention allow this 'state' information to be stored either in a separate external storage or as part of the metadata associated with individual data elements. The provenance system needs this state information and the stream bindings, in conjunction with the dependency functions, to determine exactly which input streams, and their appropriate sub-segments, might have been associated with a specific set of output data elements.

The embodiments of the present invention further store all the data, generated by input streams and corresponding output streams, which may be needed to be part of the response to a provenance query. As provenance is a feature that is typically invoked at an arbitrary future time instant, the mechanism for resolving the data dependencies clearly requires the system to have access to the actual stream elements that were generated or entered the stream processing system in the past. To enable the data dependency reconstruction using stream-level specifications, it is also important that the data elements be stored in a manner such that it is possible to ascertain the identifier of the specific stream to which a specific data element belongs. This may be accomplished by either embedding the stream identifier as part of the metadata associated with an element, or via a variety of other well-known storage indexing techniques. In many application domains, such storage of the incoming, outgoing or intermediate data is required to satisfy a variety of legal and professional requirements. However, an aspect of this invention is the ability to specify provenance dependency functions on a collection of PCs (PC cluster), such that the dependencies are specified only over the streams that act as either inputs to or outputs of the cluster. In this case, the data streams that occur internal to the cluster, specifically, are input and output data elements of intermediate PCs in the cluster, are not relevant to the provenance dependency and need not be stored. This mechanism of PC clustering enables a stream processing system to support the reconstruction of data dependencies at variable granularities, and may also significantly reduce the data storage overhead of the overall system.

Referring initially to FIG. 1, the basic functional components of a stream processing system are shown, explaining the relationship between PCs, input and output ports and data streams. In particular, the invention focuses on a processing graph consisting of two stream PCs, such that the output from one PC (PC A) 102 acts as an input to the second PC (PC B) 104. The figure shows that PC A 102 has multiple incoming data streams. For logical discussion, it is assumed that each PC has a distinct number of input and output ports, such that multiple streams can be bound to each input port, only one output stream is identified with a single output port. Thus, in the figure, PC A 102 has two input ports $P^i_1$ 106 and $P^i_2$ 108, while PC B 104 has two input ports $P^i_3$ 110 and $P^i_4$ 112. Similarly, PC A 102 has one output port $P^o_1$ 114, while PC B has two output ports $P^o_2$ 116 and $P^o_3$ 118, respectively. Of these streams, stream $S_1$ and stream $S_2$ are shown in bold to indicate that they were bound to PC A 102 over the entire lifetime of the operation of PC A 102, with $S_1$ being bound to $P^i_1$ 106 and $S_2$ being bound to $P^i_2$ 108. In addition, FIG. 1 also shows that stream $S_3$ (an ephemeral stream) was bound to input port $P^i_2$ 108 of PC A 102 for a subset of the total time duration (for illustration purposes, it is assumed this binding was active during the time interval (70,750)). PC A 102 operated on these streams (due to the ephemeral nature of the data streams, PC A had a different number of input streams at different times) and generated a single output stream $S_5$. PC B 104 on the other hand has two input ports $P^i_3$ 110 and $P^i_4$ 112; while the input stream $S_4$ is bound to $P^i_4$ 112, the output stream $S_5$ from PC A 102 acts as an input stream for PC B 104 bound to port $P^i_3$ 110. The history of these bindings may be conceptually represented by a temporal graph (where each port of a PC corresponds to a graph vertex, and each of the streams corresponds to an incoming or outgoing edge of the vertex).

Figure 2:
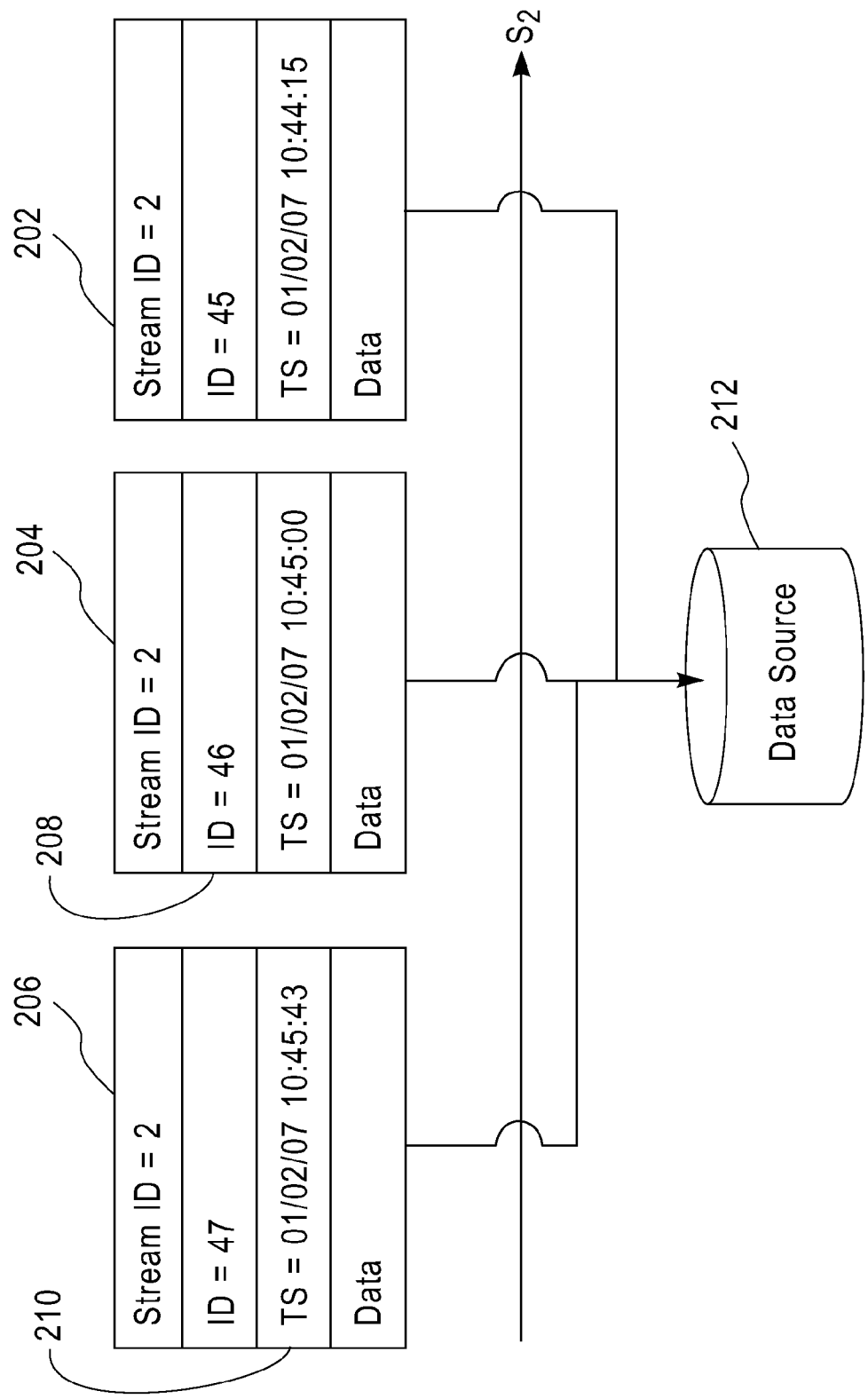
FIG. 2 is a diagram illustrating the relationship between multiple successive elements of a data stream, according to an embodiment of the present invention.

Referring now to FIG. 2, the diagram illustrates the relationship between multiple successive elements of data stream, including a description of the key fields, such as stream identifier and sequence number, which are a core part of the metadata associated with each stream element. FIG. 2 may be considered a detailed description of the fundamental nature of each of the streams defined in FIG. 1. Conceptually, each stream can be considered to consist of a distinct sequence of discrete data events, with the data events organized in a specific temporal sequence. The concept of a stream proves to be an especially useful one for many sensor-based scenarios, where each stream represents the logical aggregation of data possessing some common property. Thus, a stream may represent the samples of ECG data for one individual generated periodically by an ECG monitor, or the intermittent samples of motion data generated by a specific motion sensor located over the north-east door on the third floor of a building. (The notion of a stream thus implies that there exists some strong temporal sequence among the data samples—it thus makes sense to associate primitives such as "third element of sequence after this particular element" or "all elements that occurred with the interval (10,15) seconds prior to the occurrence of this element".) FIG. 2 shows a set of three distinct consecutive elements generated for stream $S_2$, each element is identified by its stream identifier (2) and the corresponding stream sequence number. Thus, the three elements are $S_2(45)$ 202, $S_2(46)$ 204 and $S_2(47)$ 206, with a higher sequence number generally implying that the corresponding element was generated later (occurred after) than an element with a lower sequence number. Moreover, the figure illustrates that each data element is associated with at least an ID, such as, for example, the ID 208 for $S_2(46)$ is 46, and a generation timestamp (TS), such as, for example, the TS value 210 for $S_2(47)$ is "Jan. 2, 2007 10:45:43". To ensure the ability to reconstruct and establish the data dependencies, it is assumed that each of these individual data elements will be stored in a Data Store 212, which may subsequently be interrogated to retrieve sets of data elements based on stream identifiers, sequence IDs or timestamps.

Figure 3:
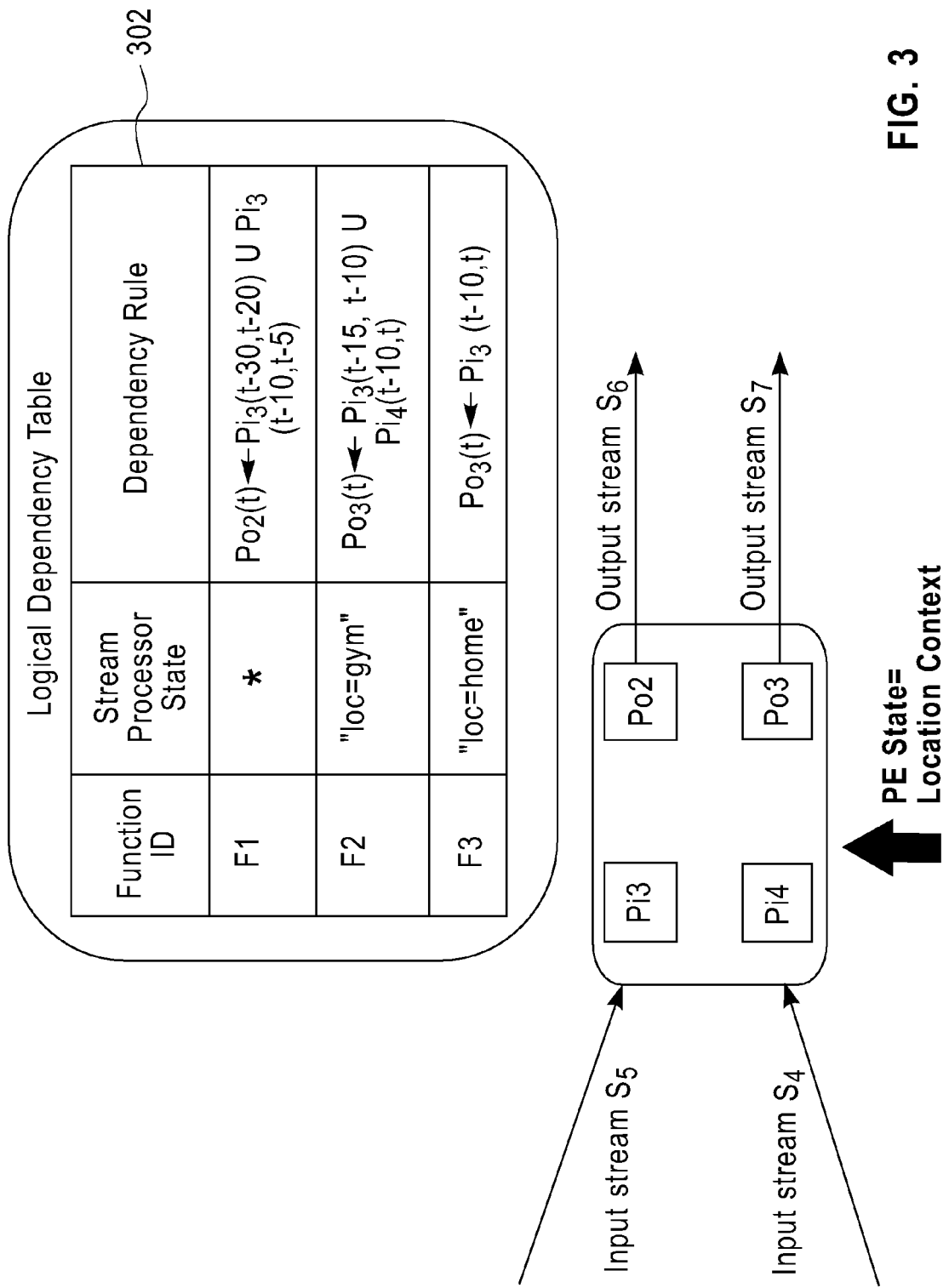
FIG. 3 is a diagram illustrating the basic organization of the functional temporal dependency model, according to an embodiment of the present invention.

Given these concepts of stream bindings, element-level sequences and input/output ports associated with an individual PC, FIG. 3 shows the basic organization of the functional dependency model, illustrating a specific form of temporal dependency. The figure shows how a specific PC (PC B) has associated with it a set of 3 distinct logical functions, with each logical function defined by a row of the Logical Dependency Table (LDT) 302. In an abstract sense, each logical function expresses dependence between an output port of the PC, and one or more input ports of that PC. Thus, the logical function F1 (row 1 in the LDT) symbolically expresses the notion that the output data element associated with output port $P^o_2$ at time t depends on the set of input samples from $P^i_3$ that occur during the time windows (t-30,t-20) and (t-10, t-5).

Similarly, the logical function F2 (row 2 in the LDT) expresses the fact that the output data elements associated with output port $P^o{}_3$ depends on input samples from $P^i{}_3$ in the time window (t-15, t-10) and input samples (t-10,t) from port $P^i{}_4$. In addition, logical function F3 also expresses the dependency relationship that the output data element associated with output port $P^o{}_3$ depends solely on input samples from port $P^i{}_3$ in the time window (t-10,t). This association of two separate dependency functions with output port $P^o{}_3$ is explained by the "state/context" field—as explained previously, it is possible that the dependency function for any specific port may vary based on the PC's internal state or some external contextual state. In this particular example, if the 'state/context' information at time t satisfied the attribute "location=gym", then F2 would describe the data dependency of an output data element that was generated at time t by port $P^o{}_3$.

FIG. 3 also demonstrates one of the preferred embodiments of the dependency function—namely, temporal dependence. Under temporal dependence, the dependency is specified in terms of time windows relative to the generation of the output data element. In this case, the generic association between an element of an output stream and corresponding elements of an input stream may be described by the following mathematical equation. For any element $e_i(t) \in S_j$, with a creation timestamp of t, the following relationship holds:

$$e_i(t) \Leftarrow \bigcup_{j: S_j \text{ is input to } PE_i} \bigcup_{k=1}^{L_j} \{e: e \in S_j(t - start_{jk}, t - end_{jk})\} \quad (1)$$

where $L_j$ is the number of distinct disjoint 'time intervals' which define the values of relevant input events belonging to input stream $S_j$ on which $e_i(t)$ depends, and $start_{jk}$ and $end_{jk}$ define the boundaries of these intervals.

Figure 4:
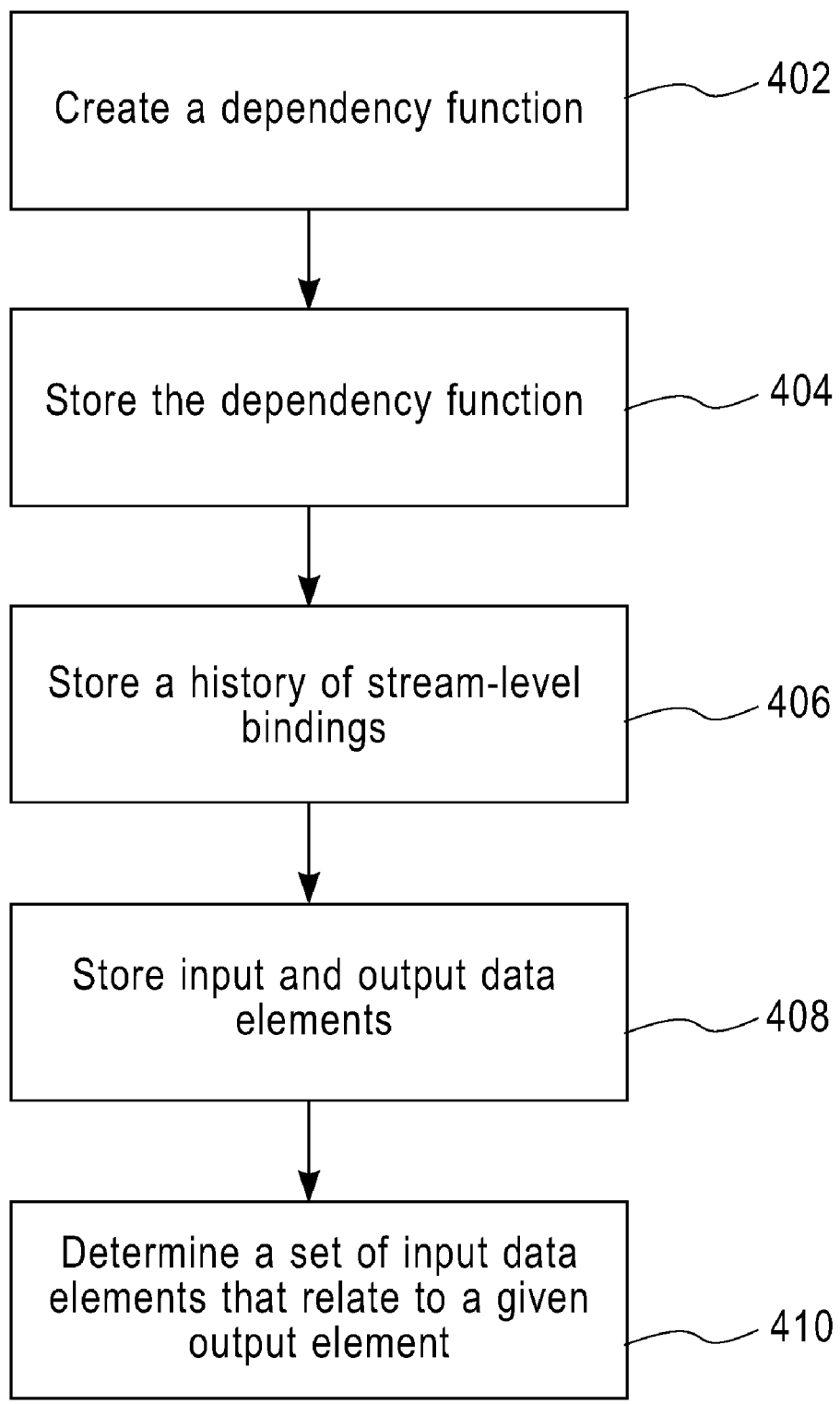
FIG. 4 is a flow diagram illustrating a provenance derivation methodology, according to an embodiment of the present invention.

Referring now to FIG. 4, a flow diagram illustrates a provenance derivation methodology, according to an embodiment of the present invention. The methodology begins in block 402 where at least one dependency function is created that relates a given output data element to a set of one or more input data elements. The dependency function comprises an encoding of temporal filters or sequence filters relating to input data elements. In block 404, the dependency function is stored. In block 406, a history of stream-level bindings is stored. The history is for input streams to input ports of the processing component and output streams from output ports of the processing component. In block 408, input data elements from the input streams and output data elements from the output streams are stored. In block 410, in response to a query for the dependent set of data elements for a given output data element, a set of one or more input data elements that relate to the given output data element is determined in accordance with the dependency function and the history of stream-level bindings, terminating the methodology.

Figure 5:
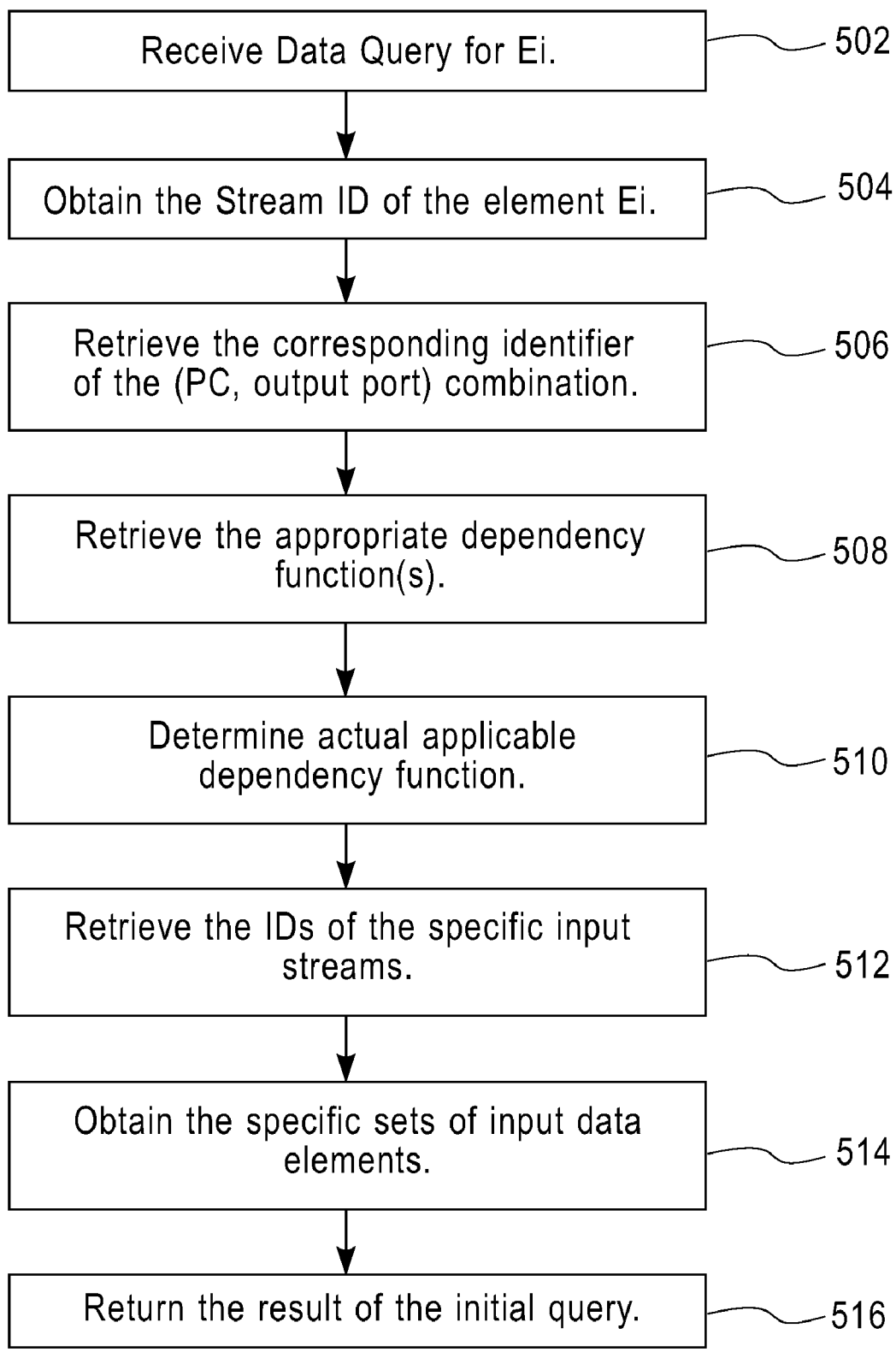
FIG. 5 is a flow diagram illustrating a provenance query resolution methodology, according to an embodiment of the present invention.

Referring now to FIG. 5, a flow diagram shows the logical steps involved in the resolution of a provenance query. This may be considered a detailed description of block 410 of FIG. 4. These steps are invoked by the provenance derivation subsystem to retrieve the set of causative data elements from input streams associated with a specific element belonging to an output stream. The methodology begins in block 502 where a provenance query is received for any given element Ei. As mentioned above, it is assumed that the provenance system architecture has already ensured that a) every data element stored in the data store is associated with a timestamp and sequence number, as well as the identifier of the stream to which it belongs and b) the dynamic history of stream bindings to specific input and output ports, for all instances of PCs in the stream processing system, has been stored separately in a Stream and Port Mapping (SAPM) store and can be queried to retrieve appropriate pairings between stream IDs and port IDs.

Given this model, the first step in the reconstruction process is to obtain the stream ID of the element Ei in block 504. Using this stream element, the dependency derivation subsystem will then consult the SAPM repository to retrieve the corresponding identifier of the (PC, output port) combination that generated this ID in block 506. Once this combination has been retrieved, then the SAPM repository is again queried in block 508 to retrieve the appropriate dependency function (or functions) associated with that output port. The possibility of multiple dependency functions is addressed to accommodate the afore-mentioned possibility that the dependency is state-dependent.

After retrieving the set of possible dependency functions, the actual applicable dependency function is then determined in block 510 based on an analysis of the state that applied to the PC at the time of generation of Ei. In one embodiment of this approach (assumed in the figure), this state of the PC may have been appended as metadata to each individual data element—in this case, the knowledge of the appropriate 'state' or 'context' is available from the metadata associated with Ei itself. Alternately, in another embodiment of the context storage, this context may have been logged in a separate store and an external context retrieval service may be used to retrieve the pertinent state or context at the applicable time t.

Once the applicable dependency function is determined, the specifications of the dependency function are used, along with the information in the SAPM repository, to retrieve the IDs of the specific input streams in block 512, as well as their corresponding time windows, that were specified to be involved in the generation of Ei. In the final step of the process, the data repository is queried, using the retrieved stream identifiers and the associated time windows, to obtain the specific sets of input data elements that lie within the designated time intervals and belong to the specified streams in block 514. The resulting sets of input data elements are stored in the result set Depend, which is then returned as a result of the initial query in block 516.

Figure 6:
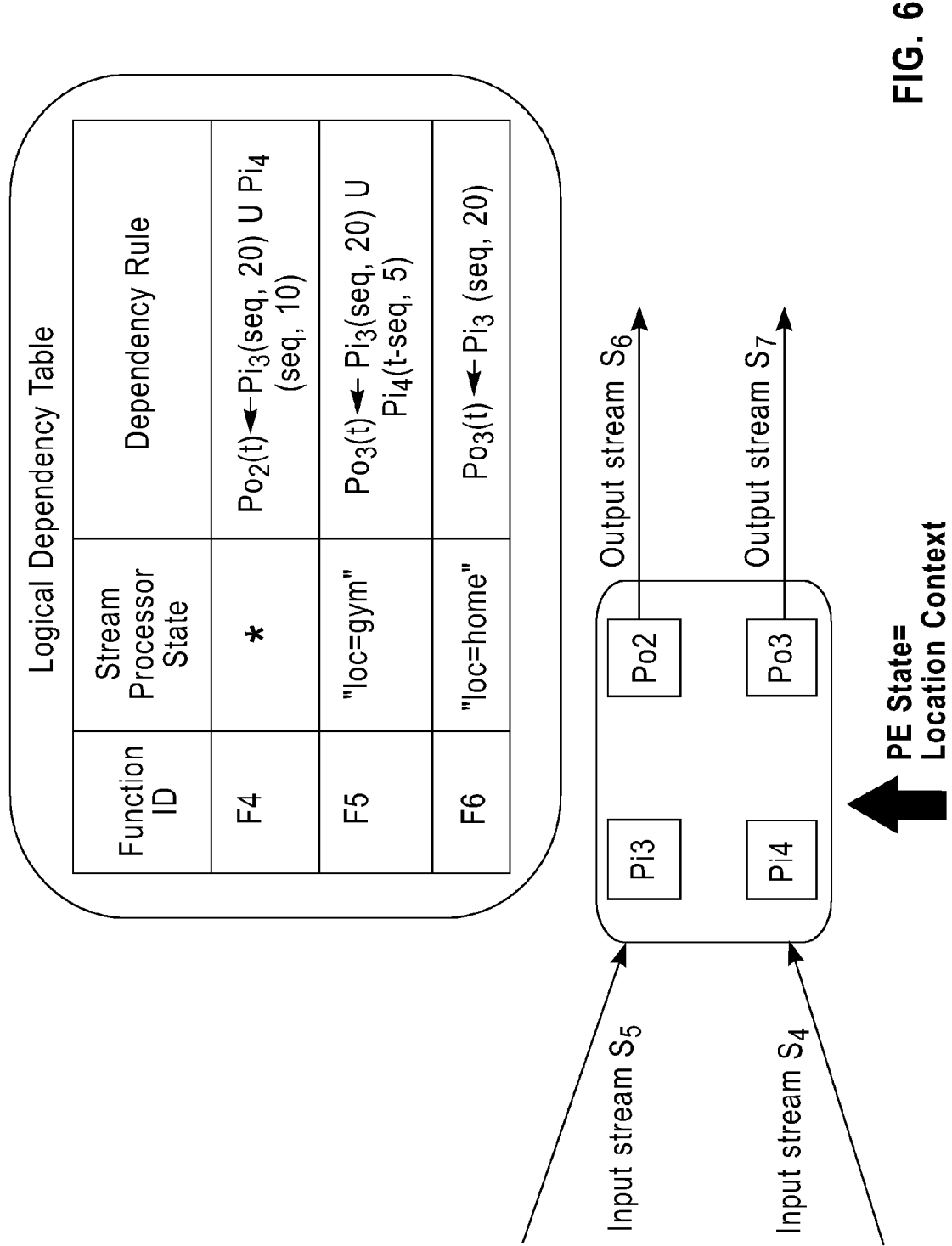
FIG. 6 is a diagram illustrating the organization of a functional sequence-based dependency model, according to an embodiment of the present invention.

In addition to time-based dependency, the function-based model permits a variety of other forms of dependency specifications. FIG. 6 illustrates one such model, called 'sequential functional specification model'. In this model, the sets of relevant input data elements are specified not in terms of time windows but through predicates on the sequence numbers associated with these elements (recall that stream elements are assumed to possess monotonically increasing sequence numbers to capture their temporal evolution). As FIG. 5 shows, PC B has a 'sequential' functional specification F4, which indicates that the output of a stream from $P^o{}_2$ at any time depends on the causal sequence of the prior 20 input data elements associated with input port $P^i{}_3$ and the prior 10 input data elements associated with input port $P^i{}_4$. In this case, it is assumed that the sequence is defined in reverse-temporal order, such that any element of the input sequence has to have a generation time that is prior to the generation time of a specific output data element Ei. In general, the sequence specification could also be specified to start not from the most recent causal sample, but from a certain point in the past, such as, for example, the most recent $15^{th}$ to the most recent $5^{th}$ sample, in effect excluding the most recent 5 samples).

Figure 7:
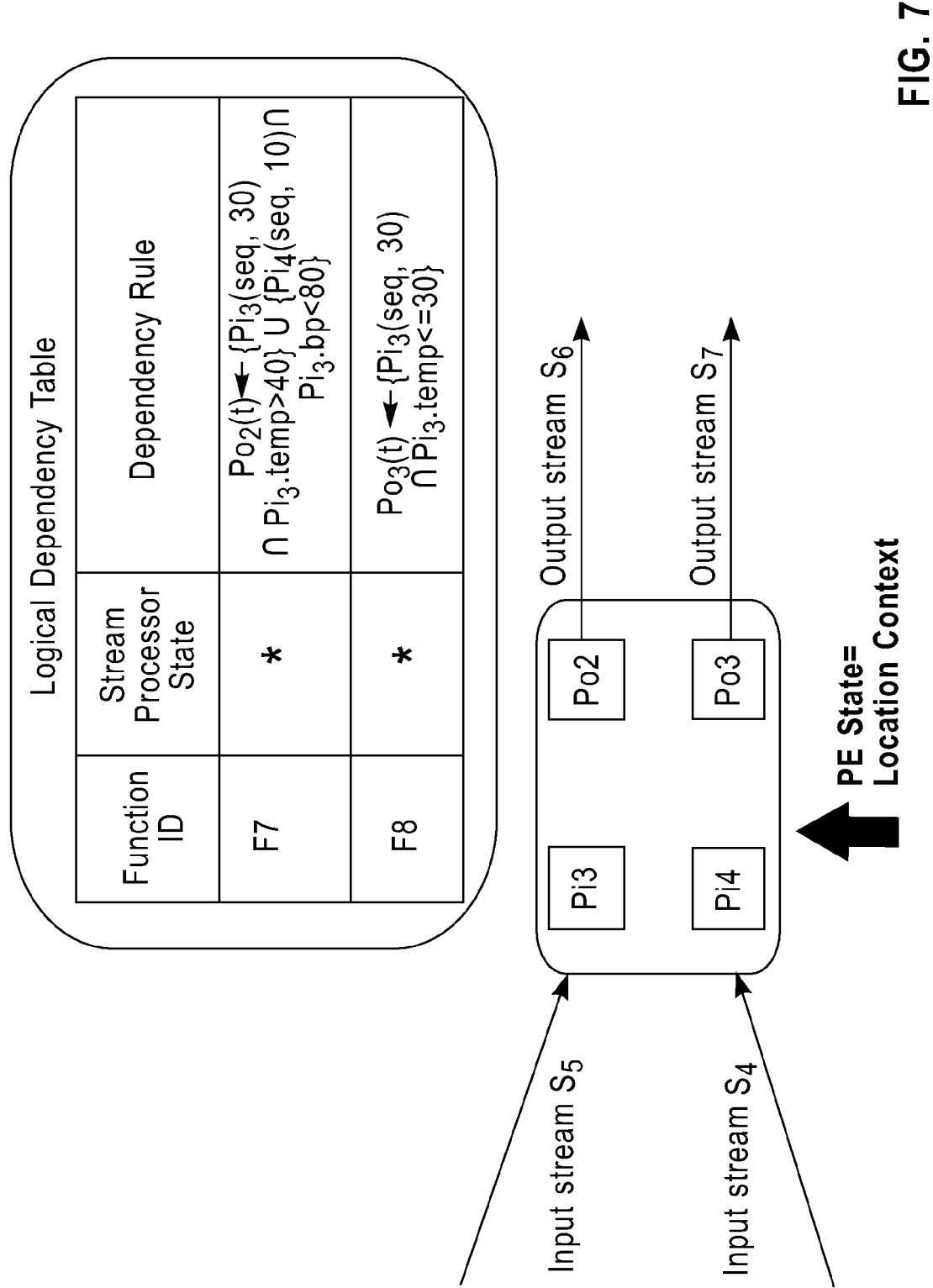
FIG. 7 is a diagram illustrating the organization of a functional attribute-based predicate driven dependency model, according to an embodiment of the present invention.

To illustrate further embodiments of function-based specifications, FIG. 7 illustrates an alternate "attribute-based sequential model". In this model, rule F7 indicates that the output at time t depends on the last 30 values of elements belonging to stream S5 that have the "temperature" attribute value greater than 40 and the last 10 values of elements belonging to stream S4 that have the "blood pressure" attribute lower than 80. While the steps of storing the provenance information, specifically the model specification and the dynamic stream and port bindings, are identical across all these models, the actual technique for reconstructing the dependency specifications will vary slightly from that outlined in FIGS. 4 and 5.

Figure 8:
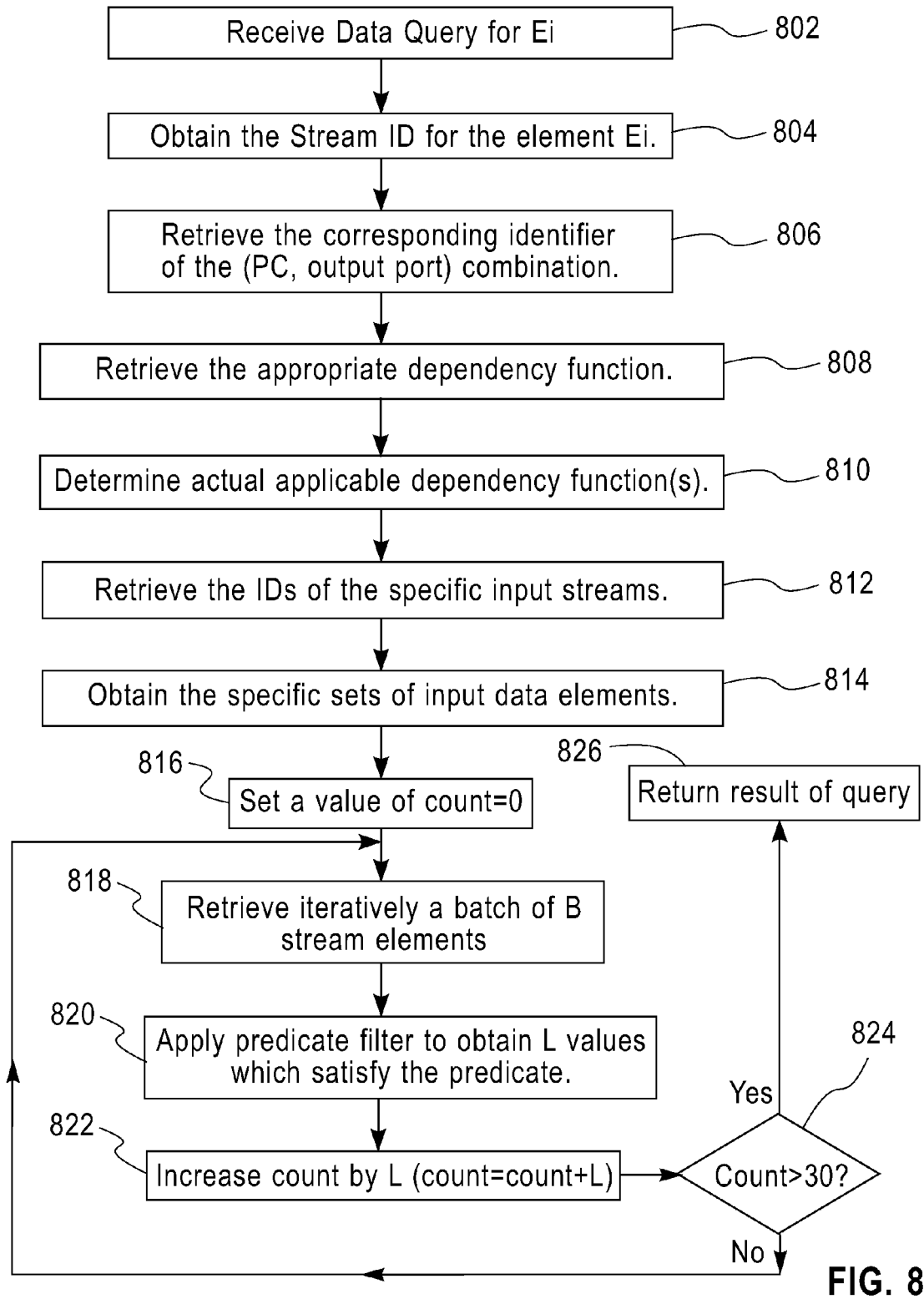
FIG. 8 is a flow diagram illustrating a provenance query resolution methodology for the attribute and sequence-based predicate-driven functional model, according to an embodiment of the present invention.

For the "attribute-based sequential" specification F1 presented in FIG. 7, FIG. 8 illustrates the steps in the resolution of the causative data elements using the function F8 in response to a provenance query for Ei in block 802. The initial steps of determining the stream ID in block 804, the associated output port in block 806, obtaining the dependency functions in block 808, evaluating the relevant context or state to ascertain the applicable dependency function in block 810 and obtaining the set of input streams in block 812 are identical to those enumerated in FIGS. 4 and 5. However, once the corresponding input stream IDs have been determined, the provenance derivation subsystem must then retrieve either individually (or in batches) the corresponding set of stream elements from each input stream. For the sake of illustration, it is assumed that the resolver is trying to resolve the dependent data for stream S5 in block 814, specifically, the last 30 values where temperature<=30. To do this, the derivation subsystem may set a value of count=0 in block 816, and then retrieve iteratively a batch of B stream elements in block 818. This retrieval process works "backwards"—the first batch retrieved corresponds to the B (say equal to 50) elements of S5 that occurred most recently before time t, the second batch is the previous B elements of S5 etc. For each batch, the derivation subsystem then applies the predicate filter "temperature<=30" to obtain a smaller set of samples which satisfy the predicate in block 820. Let us assume that L (say equal to 5) values satisfy the predicate. These elements are stored in the response set SET, the counter count is incremented in by L in block 822, such as, for example, count=count+5, and the process is then repeated at block 818 unless count is now >=30 in block 824. If the count is >=30 in block 824, the stored response set SET is reported to a user in answer to the query in block 826.

This specific example illustrates a more general approach to data reconstruction—by essentially working in reverse temporal order, and evaluating the specific filter (either temporal, sequential or attribute-predicate based), the provenance derivation subsystem can determine the appropriate set of input data elements that match the specifications of the dependency function. It should also be apparent that this technique can be applied to any mixed-dependency function, such as, for example, one whose specification consists of a mixture of temporal, sequence-based and predicate-based filters. For example, it can be applied to reconstruct a dependency that indicates that output at time t depends only on input samples on port 40 on the last 50 samples having values of temperature >40, as long as those samples occur within the time (t-50,t-10). In case there are not 50 such samples, then the output depends only on as many samples are found that meet the above criteria.

This invention does not concern itself with the specific language or syntax in which the dependency function is specified. What this invention describes is the function-based model and the process of storing and resolving the provenance information—the exact syntax for the functional specification is outside the scope of this invention. A variety of known and existing techniques can be used for the specification, with the appropriateness of a particular syntactical model depending on the amount of expressiveness and functional flexibility desired. For example, the function may be defined in terms of an XML document, with the XML document having elements consisting of well-defined stream operators. Alternatively, the functional specification may itself contain executable code, such as, for example, Java code, such that the Java code needs to be executed at runtime to provide the resulting set of input data elements. One example of such technology is IBM's Active Correlation Technology (ACT), which defines a set of modular event correlation components that can aggregate, filter or correlate events. As another alternative, the specification may be in some symbolic algebraic form, with a well-known algebraic mathematical compiler, such as, for example, Mathematica or Mathcad, being used to resolve the symbolic dependencies.

The description of the provenance reconstruction process, as outlined by FIGS. 2-8, requires the system to have all the corresponding data elements for input and output streams stored in persistent storage, so that they may be retrieved during the query resolution phase at future time instants. In general, the processing logic for many stream-based applications involves a potentially large set of PCs, logically organized into a processing graph (with edges representing the connections between individual PCs). In many such cases, the data provenance information may not be needed at the finest granularity of each individual PC, but only at coarser, aggregate granularity.

Figure 9:
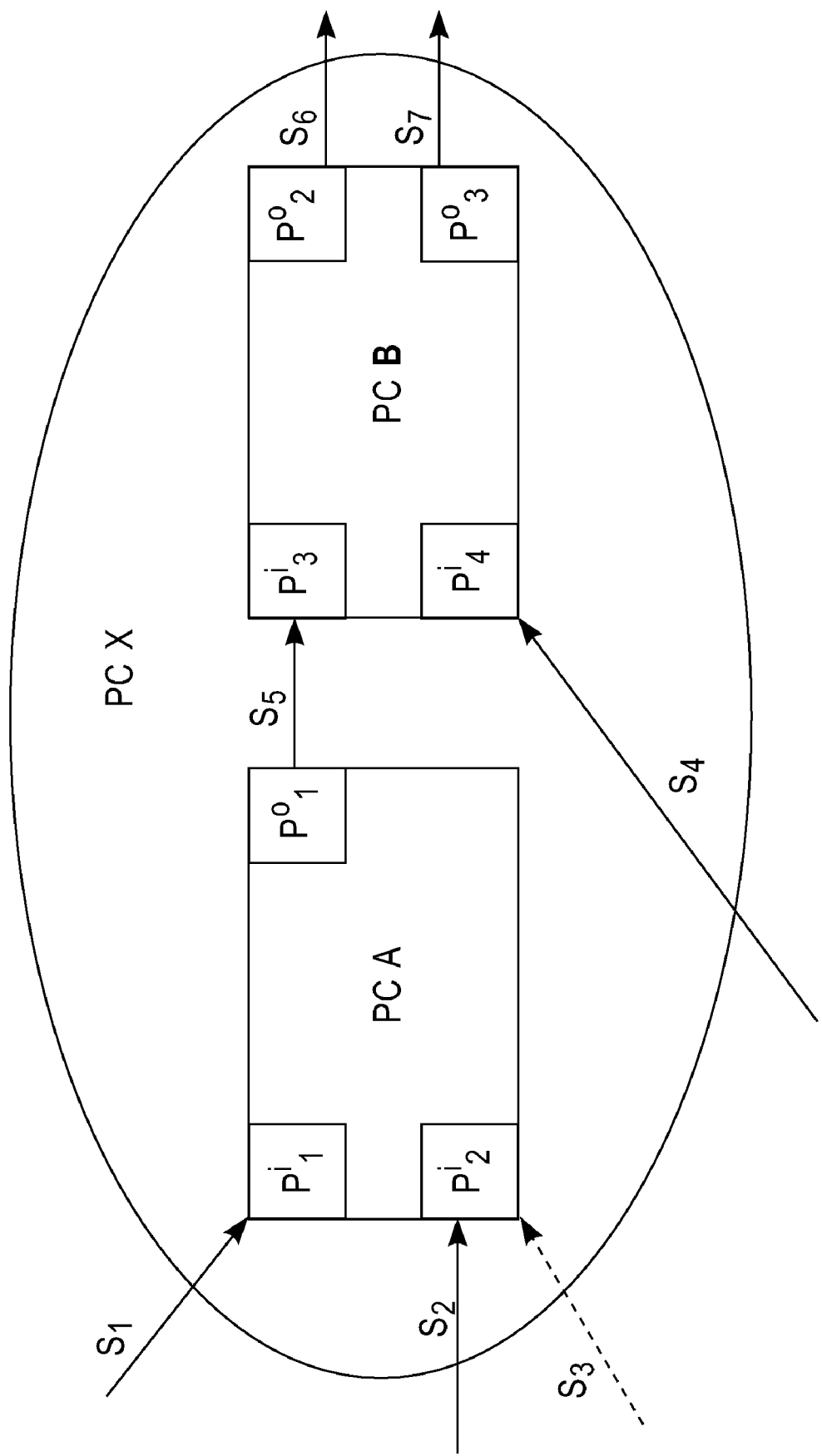
FIG. 9 is a diagram illustrating clustered processing elements, according to an embodiment of the present invention.

FIG. 9 shows one example of such clustering, where the PC A 902 and PC B 904 are considered to be a logical PC cluster called PC X 906. In this case, the only interest is in capturing the provenance dependencies between the streams externally visible to the cluster, specifically, the dependencies between input streams S1, S2, S3 and S4 and output streams S6 and S7. The advantage of this approach of clustering is that it is no longer necessary to store the values for the intermediate streams S5. This invention allows such a possibility by allowing a dependency function to be defined for a PC "group" or cluster. As before, the actual dependency between the externally visible input and output data elements of a cluster may have been specified manually, through partial automation (by having some intelligent agent cascade the dependencies of individual constituent elements) or via complete automation, such as, for example, observation of empirical output and input data element values for the externally visible streams. Given such a cluster, the process of reconstructing the data dependency is then similar to that outlined in FIGS. 4 and 5, except that the process of resolving the functional dependency now requires the provenance derivation subsystem to determine the ID of the "PC cluster" and its associated port that generated the output stream.

Once the PC cluster and output port have been ascertained, then the system can obtain the corresponding "cluster-level" dependency function and then follow the same process (of filtering on the externally visible input streams) to obtain the appropriate set of input data elements. To achieve this, the 'state' specification will now however need to express the combination of multiple states/context of all the constituent PCs. Moreover, the relevant collective state information must also be stored—either externally as part of an external context or state storage service, or as metadata that is appended to the generated output data elements. In particular, in the latter case, each of the intermediate PCs, such as, for example, in FIG. 9, PC A appends its state to elements of S5, will have to ensure that they append their contextual state to the prior state specified by upstream PCs (thus PC B appends its state to the state already added by upstream PC A, and includes this composite state in the output data elements of stream S6), so that the externally visible data elements, specifically, the output data elements for streams S6 and S7 in FIG. 9, have all the necessary state data to help resolve the dependency functions.

The examples and illustration so far have indicated how the output stream of a specific PC may be resolved to the corresponding data elements from the input streams to that PC. This step illustrates a one-level data dependency reconstruction—the system provides the resolution only up to one level in the data dependency hierarchy. However, an aspect of this invention allows for the recursive use of this technique to determine the data dependency to multiple upstream levels. For example, in the example outlined in FIG. 1, the logical steps outlined in FIGS. 4 and 5 may first be used to reconstruct the provenance for an element of S6, specifically, retrieve the corresponding input data elements from streams S5 and S4. However, to further reconstruct the upstream dependencies, the technique of FIGS. 4 and 5 can now be applied to each such retrieved element of the stream S5, to obtain in turn the causative elements from the streams S1, S2 and S3.

Figure 10:
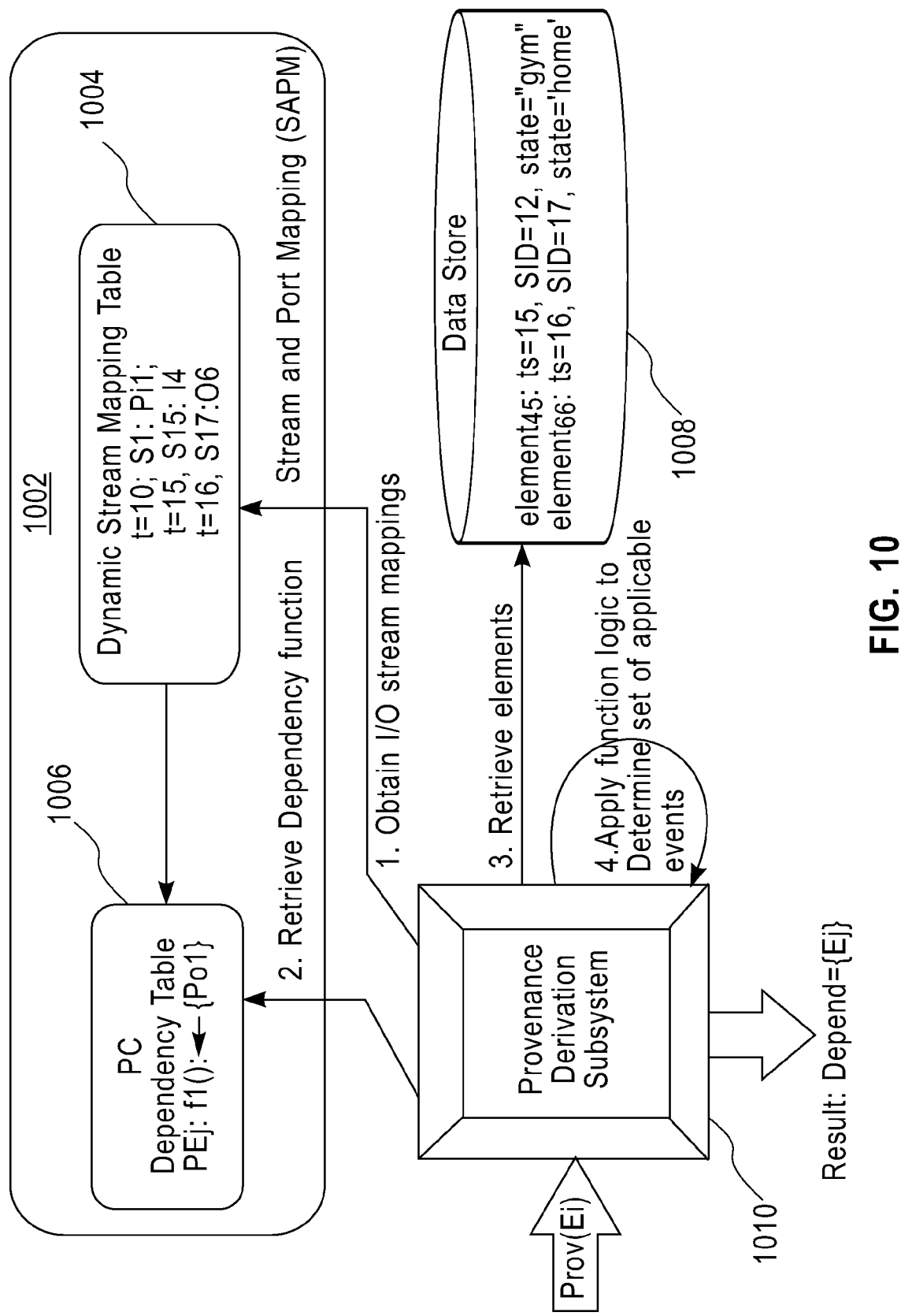
FIG. 10 is a diagram illustrating various subsystems and functional components that are needed to store the dynamic provenance metadata and subsequently resolve a provenance query, according to an embodiment of the present invention.

The methods and techniques described in the preferred embodiment above require the help of various components of the provenance subsystem. FIG. 10 shows the various functional components of the Provenance subsystem needed to support both the storage of provenance metadata and the subsequent derivation of provenance according to the functional model. The SAPM 1002 acts as a repository for all the dynamic connection information within the stream processing subsystem. The SAPM includes a Dynamic Stream Mapping 1004 table that stores the dynamic mapping of input and output streams to specific ports and the PC Dependency table 1006 that stores the history of the creation and destruction of PCs and applications, and the corresponding functional specifications associated with specific output and input ports of every such created PC. The Data store 1008 is used to store the data elements for each individual stream. Finally, the Provenance derivation subsystem 1010 interacts with both the SAPM and the Data store to retrieve the necessary information and apply the necessary filtering logic (as exemplified by the methods outlined in FIGS. 4, 5 and 9) to construct the final set Depend, containing the collection of causative elements.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for deriving a provenance of one or more of a plurality of output data elements generated from a given output port of a processing component of a data stream processing system, comprising the steps of:

creating at least one dependency function that relates the one or more output data elements to a set of one or more input ports of the processing component and a corresponding plurality of input data elements, wherein the dependency function comprises an encoding of at least one of one or more temporal filters and one or more sequence filters relating to the plurality of input data elements;

storing the at least one dependency function;

storing a history of stream-level bindings of one or more input streams to one or more input ports of the processing component and one or more output streams from one or more output ports of the processing component, and storing the plurality of input data elements belonging to the one or more input streams and the plurality of output data elements belonging to the one or more output streams; and determining a set of one or more input data elements from the plurality of input data elements that relate to the one or more output data elements in accordance with the at least one dependency function and the history of stream-level bindings.

2. The method of claim 1, wherein, in the step of creating a dependency function, the dependency function comprises an encoding of one or more temporal filters and dependency is specified in terms of sets of past time windows relative to a time at which the one or more output data elements are generated.

3. The method of claim 1, wherein, in the step of creating a dependency function, the dependency function comprises an encoding of one or more sequence filters and dependency is specified in terms of sets of at least one of past sample windows and data element sequences relative to at least one of a time and a sequence identifier associated with the one or more output data elements.

4. The method of claim 1, wherein the step of creating a dependency function comprises the step of associating a predicate-based dependency function, wherein dependency is defined in terms of one more predicates over the set of one or more input data elements.

5. The method of claim 1, wherein the step of creating a dependency function comprises the step of associating a set of distinct dependency sub-functions, such that each sub-function is associated with a set of values assumed by internal or external state variables used by the processing component.

6. The method of claim 1, wherein, in the step of creating a dependency function, the dependency function comprises an encoding of one or more temporal filters and one or more sequential filters.

7. The method of claim 1, wherein the step of creating a dependency function comprises the step of associating a default dependency function that relates each output data element of the one or more output streams to all elements of the one or more input streams.

8. The method of claim 1, wherein the step of storing the history of stream-level bindings comprises the step of storing a static set of bindings between streams and processing components.

9. The method of claim 1, wherein the step of storing the history of stream-level bindings comprises the step of storing a dynamic set of time-varying bindings between streams and processing components.

10. The method of claim 1, further comprising the step of storing a history of a state of the processing component, wherein the state comprises at least one of an internal state and an external state, and wherein the set of one or more input data elements is determined in accordance with the history of the state.

11. The method of claim 10, wherein the step of storing the history of the state comprises the step of storing, on a persistent storage medium, at least one of the internal state of the processing component and the external state of an environment, separately and independently from the plurality of output data elements.

12. The method of claim 11, wherein the step of storing on a persistent storage medium comprises the step of implicitly achieving the storage functionality using an external service that is able to retrieve contextual history of the environment at a future time.

13. The method of claim 10, wherein the step of storing the history of the state comprises appending state information as metadata to one or more of the plurality of output data elements.

14. The method of claim 1, wherein the step of determining the set of one or more input data elements comprises the steps of:
   determining at least one of the one or more input streams that contributed to the generation of the one or more output data elements from the history of stream-level bindings; and
   applying the at least one dependency function over the at least one of the one or more input streams to determine the set of one or more input data elements that satisfy the at least one dependency function.

15. The method of claim 14, wherein the step of determining at least one of the one or more input streams comprises the steps of:
   retrieving a generation time and a stream identifier of the one or more output data elements;
   retrieving a set of input streams that were bound to the output port generating the said output stream identifier, with an appropriate time window prior to the generation time of the one or more output data elements.

16. The method of claim 14, wherein the step of applying the at least one dependency function comprises progressively increasing the set of data elements, in reverse-temporal order, associated with the input streams, until the corresponding temporal, sequence or predicate based function is satisfied.

17. The method of claim 14, wherein the step of applying the at least one dependency function comprises the steps of:
   determining the set of all input streams that ever bound to the corresponding output port generating the said data stream prior to the generation time of said data element;
   retrieving all the data elements for said set of input streams with generation timestamps prior to the generation time of said data element.

18. Apparatus for deriving a provenance of one or more of a plurality of output data elements generated from a given output port of a processing component, comprising:
   a memory; and
   at least one processor coupled to the memory and operative to: (i) create at least one dependency function that relates the one or more output data elements to a set of one or more input ports of the processing component and a corresponding plurality of input data elements, wherein the dependency function comprises an encoding of at least one of one or more temporal filters and one or more sequence filters relating to the plurality of input data elements; (ii) store the at least one dependency function; (iii) store a history of stream-level bindings of one or more input streams to one or more input ports of the processing component and one or more output streams from one or more output ports of the processing component, and store the plurality of input data elements belonging to the one or more input streams and the plurality of output data elements belonging to the one or more output streams; and (iv) determine a set of one or more input data elements from the plurality of input data elements that relate to the one or more output data elements in accordance with the at least one dependency function and the history of stream-level bindings.

19. A computer program product for enabling derivation of a provenance of one or more of a plurality of output data elements generated from a given output port of a processing component, the computer program product comprising:
   a computer readable storage medium for storing;
   a first program instruction to create at least one dependency function that relates the one or more output data elements to a set of one or more input ports of the processing component and a corresponding plurality of input data elements, wherein the dependency function comprises an encoding of at least one of one or more temporal filters and one or more sequence filters relating to the plurality of input data elements;
   second program instructions to store the at least one dependency function;
   third program instructions to store a history of stream-level bindings of one or more input streams to one or more input ports of the processing component and one or more output streams from one or more output ports of the processing component, and store the plurality of input data elements belonging to the one or more input streams and the plurality of output data elements belonging to the one or more output streams; and
   fourth program instructions to determine a set of one or more input data elements from the plurality of input data elements that relate to the one or more output data elements in accordance with the at least one dependency function and the history of stream-level bindings.

* * * * *